United States Patent

[11] 3,622,978

[72] Inventor Paul Lipschutz
Croissy-sur-Seine, France
[21] Appl. No. 846,048
[22] Filed July 30, 1969
[45] Patented Nov. 23, 1971
[73] Assignee Societe d'Exploitation des Brevets Neiman S.A.
Neuilly-sur-Seine (Haute de Seine), France
[32] Priority Aug. 2, 1968
[33] France
[31] 161606

[54] WARNING ARRANGEMENT IN ANTITHEFT SAFETY LOCKING DEVICE ON AUTOMOTIVE VEHICLES
7 Claims, 8 Drawing Figs.
[52] U.S. Cl. .................................................. 340/64,
200/44, 70/237
[51] Int. Cl. .................................................. B60r 25/04
[50] Field of Search .................................................. 340/52, 64,
274; 70/388, 237; 200/44

[56] References Cited
UNITED STATES PATENTS
| | | | |
|---|---|---|---|
| 1,826,649 | 10/1931 | Briggs.............................. | 200/42 UX |
| 3,138,780 | 6/1964 | Jacobsen......................... | 340/52 D |
| 3,391,260 | 7/1968 | Messera.......................... | 340/274 |

Primary Examiner—John W. Caldwell
Assistant Examiner—William M. Wannisky
Attorney—Nolte and Nolte ABSTRACT: A warning arrangement in an antitheft safety lock on an automotive vehicle, operable by a removable key and comprising switch means engageable by said key upon insertion in its keyhole and normally kept open in the absence of said key, said switch means being caused to close by insertion and remaining of said key into said keyhole and to open upon removal of said key therefrom; and an electric-signalling circuit comprising electrically actuated alarm means connected in series with said switch means and energizable by the closing of said switch means.

PATENTED NOV 23 1971 3,622,978

INVENTOR
PAUL LIPSCHUTZ
BY
Nolte & Nolte
ATTORNEYS

WARNING ARRANGEMENT IN ANTITHEFT SAFETY LOCKING DEVICE ON AUTOMOTIVE VEHICLES

The present invention essentially relates to a warning arrangement for an antitheft safety locking device mounted on any kind of land, floating and flying automotive vehicles.

In some countries, there are regulations forbidding to leave the safety key either in the switch controlling the starting of the vehicle engine or in the antitheft apparatus which locks the steering wheel or column or another essential member of the vehicle.

This leaving of the key in position within the lock by the driver when the latter leaves the vehicle cancels indeed any safety measure taken to prevent the theft or unutilized use of the vehicle.

Such regulations provide moreover for the compulsory installation of a signalling device operated by the opening of the door, so that at the time that the driver prepares to leave the vehicle, the alarm is given either by a loud sounding device, buzzer or the like or by a lighting device when the key has been left in the lock.

The object of the present invention is to provide a solution to this problem. The presence of the key is detected or sensed by a sensing member or feeler in the form of a shutter plate or the like closing partially or totally the keyhole. The insertion of the key within the lock causes rotation of the shutter plate the displacement of which closes a switch contact. In order to open this switch contact, it is necessary to withdraw completely the key from the lock; the shutter plate, subject to the action of a return spring, is then moved back to its initial position whereby the switch contact opens.

The conductor leads of this switch contact are connected in series with the door switch, with the loud sounding or light-alarm apparatus and if need be with a relay which breaks the signalling circuit when some electric control circuit to which the operation of the vehicle engine is responsive, such for example as the ignition coil, is energized by being fed with electric current.

The operating conditions are therefore the following:

1. When the door is open and the key withdrawn from the safety lock, there is no warning action;
2. When the key is within the safety lock, the door open, and said electric control circuit broken: a warning signal is released:
3. When the key is in the safety lock and the door is closed : no warning signal is released and the warning arrangement remains inoperative;
4. When the key is in the safety lock, the door is open and said electric control circuit is closed: the warning system is inoperative so that no warning signal is released.

The invention will be better understood and further objects, characterizing features, details and advantages thereof will appear more clearly as the following description proceeds with reference to the accompanying diagrammatic drawings given by way of non limiting example only, illustrating a form of embodiment of the invention and wherein.

Figure 1:
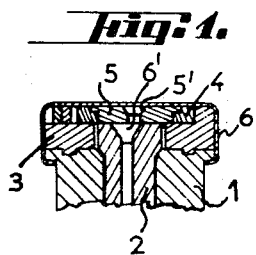
FIG. 1 shows a cross-sectional view of the head portion or top of a disk-tumbler or pin-tumbler type safety lock, the shutter plate being shown in the closed position and without the key.
Figure 2:
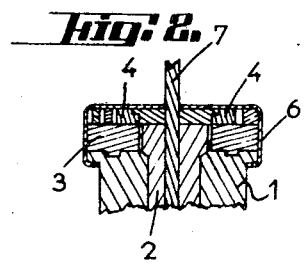
FIG. 2 shows the same section with the shutter plate in open position and a key inserted in the safety lock.

In FIGS 1 and 2 are seen the cylindrical stator or body 1 of the safety lock provided with the rotor or rotary plug 2 which forms the central rotating portion of the barrel, the disk 3 and the contact holder or carrier made from insulating material and topped by an annular plate 4 which is the aforementioned shutter plate. At 5 is seen a central small plate element formed with an inward hole 5' for the key 7. The slanting ramp portion 6' provided on the rotary plug facilitates the insertion of the key and causes the pivoting of the shutter plate 4 when said key is inserted in the safety lock.

Figure 3:
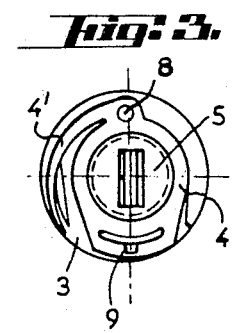
FIGS. 3 and 4 show, in the same positions, plan or top views of the barrel of the lock.
Figure 4:
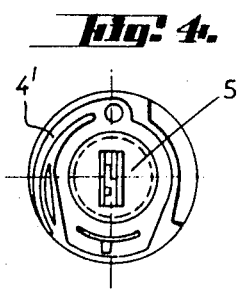
Figure 5:
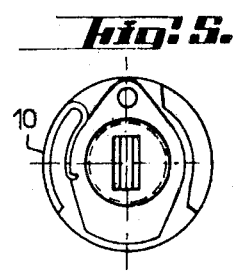
FIG. 5 shows an alternative embodiment of the device provided with a metal spring.
Figure 6:
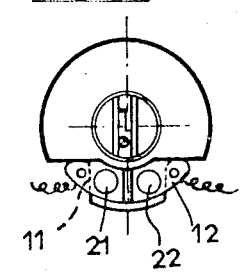
FIGS. 6 and 7 show details of the switch contact associated with the shutter plate, in plan view and in cross section, respectively.
Figure 7:
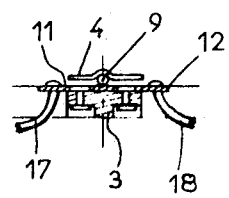

In FIGS. 3 and 4 are seen in plan view the shutter plate 4 in its two positions, respectively, said shutter plate being preferably but not exclusively made from plastic material exhibiting some resiliency. The shutter plate has a functional shape and is formed with a tongue like portion 4' forming a return spring (FIG. 5 shows in addition at 10 a modified shape or alternative embodiment of this spring which is made of metal in FIG 5). This shutter plate 4 is pivoted about its pivot pin at 8. The member 9 is an electrically conducting roller for making electric contact, as easily seen in FIGS. 6 and 7. The reference numerals 11 and 12 designate flat contact pieces secured to an insulating plate 3 or by rivets 21 and 22 shown in the position wherein the key is inserted in the safety lock.

It is seen that the small roller 9 (FIG. 7) causes the closing of this switch contact. The connecting leads 17 and 18 are secured as by welding, riveting or any other means on the small plates 11 and 12 and extend through the stationary body of the safety lock.

Figure 8:
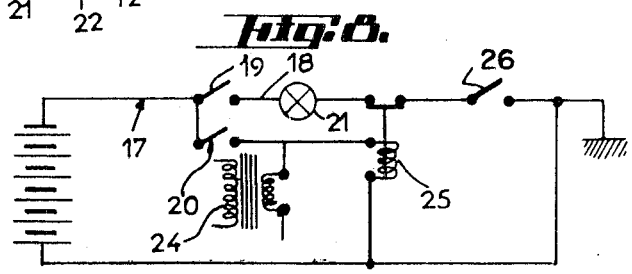
FIG. 8 is a circuit diagram showing the electrical connections of the whole assembly.

On the circuit diagram of FIG. 8 is shown the switch contact 19 already described; at 20 is shown the switch usually present in the antitheft device for feeding the ignition coil 24 and which operates at the same time the relay 25. At 26 is shown the door switch.

When the key has been left within the safety lock and the door is open, the lamp or any other warning device 21 is operated.

When the engine is running, the switch 20 is closed whereby the relay 25 is energized so that the lamp cannot be fed with electric current and is thus switched out.

It is obvious that many other alternative embodiments and modifications may be made to the arrangement described hereinabove without departing from the scope of the invention.

In summary the arrangement according to the invention consists essentially of an insulating disk carrying stationary contact pieces providing therebetween a solution of continuity which may be bridged by a contact roller which is shifted by a pivoting shutter plate moved by the operation of the key. The shutter plate is provided with resilient means for returning it automatically to its initail position wherein no contact is made when the key is withdrawn.

The electrical connections are provided to light a lamp and possibly to operate a buzzer, a bell or any other alarm signal warning the driver and indicating that he has forgotten to withdraw the key from the safety lock.

What is claimed is:

1. In a releasable antitheft safety locking device operable by a removable key insertable into a keyhole of said device which is mounted on an automotive vehicle driven by an engine the operation of which is responsive to at least one electric control circuit connected to an electric power supply and selectively controllable through actuation of said device by said key, the improvement consisting in the provision of a warning arrangement mounted in said device and comprising: switch means engageable by said key upon insertion thereof into said keyhole and normally kept open in the absence of said key, said switch means being caused to close by insertion and remaining of said key into said keyhole; and to open upon removal of said key from said keyhole; and an electric-signalling circuit comprising electrically actuated alarm means connected in series with said switch means and energizable by the closing of said switch means and switch means comprising a movable plate member formed with a key-passage hole and covering said keyhole, said plate member being secured to said device so as to be reversibly shiftable in substantially parallel relation to the plane of said keyhole between two end positions, namely: a switch-out position in the absence of said key wherein said key passage hole is offset with respect to said keyhole so as to close at least partially the latter, and a switch-on position to which said plate member is moved by insertion of said key through said key-passage hole into said keyhole; abutment means engageable by said plate member in said switch-out position thereof; biasing means for automatically urging said plate member towards said switch-out position; a pair of stationary contact pieces spaced by an insulating gap and provided within the coverage of said plate member; a moving contact piece secured to said plate member and adapted to engage both stationary contact pieces by bridging said gap therebetween in the switch-on position of said plate member; said moving contact piece being a rolling element freely engaging a mating recess formed in said plate member and interposed between the latter and said stationary contact pieces, whereby said rolling element is adapted to roll on said stationary contact pieces.

2. An arrangement according to claim 1, wherein said plate member is pivoted to said device for swinging between said end positions.

3. An arrangement according to claim 2, wherein said plate member is formed with a resilient tongue portion engaging a stationary stop provided on said device and forming said biasing means.

4. An arrangement according to claim 2, wherein said biasing means consist of a spring interposed between said plate member and a stationary stop portion formed on said device.

5. An arrangement according to claim 1 for a vehicle comprising at least one door-operated switch remaining normally open when the associated door is closed, wherein said door-operation switch is connected in said electrical-signalling circuit in series with said switch means and said alarm means.

6. In a releasable antitheft safety-locking device operable by a removable key insertable into a keyhole of said device which is mounted on an automotive vehicle driven by an engine the operation of which is responsive to at least one electric control circuit connected to an electric power supply and selectively controllable through actuation of said device by said key, the improvement consisting in the provision of a warning arrangement mounted in said device and comprising: switch means engageable by said key upon insertion thereof into said keyhole and normally kept open in the absence of said key, said switch means being caused to close by insertion and remaining of said key into said keyhole and to open upon removal of said key from said keyhole; and an electric-signalling circuit comprising electrically actuated alarm means connected in series with said switch means and energizable by the closing of said switch means; said switch means comprising a movable plate member formed with a key-passage hole and covering said keyhole, said plate member being secured to said device so as to be reversibly shiftable in substantially parallel relation to the plane of said keyhole between two end positions, namely: a switch-out position in the absence of said key wherein said key-passage hole is offset with respect to said keyhole so as to close at least partially the latter, and a switch-on position to which said plate member is moved by insertion of said key through said key passage hole into said keyhole; abutment means engageable by said plate member in said switch-out position thereof; biasing means for automatically urging said plate member towards said switch-out position; a pair of stationary contact pieces spaced by an insulating gap and provided within the coverage of said plate member; and a moving contact piece secured to said plate member and adapted to engage both stationary contact pieces by bridging said gap therebetween in the switch-on position of said plate member, said electric-signalling circuit comprising a contactor relay the contact of which are normally closed and connected in series with said switch means whereas the relay coil is connected in series said electrical control circuit, whereby said contacts open when said relay coil is energized.

7. An arrangement according to claim 6 for a vehicle comprising at least one door-operated switch remaining normally open when the associated door is closed, wherein said door-operated switch is connected in said electric-signalling circuit in series with said switch means and said alarm means.

* * * * *